US012748779B2

(12) United States Patent
Webman et al.

(10) Patent No.: US 12,748,779 B2
(45) Date of Patent: Sep. 29, 2026

(54) SYSTEM AND METHOD FOR MAINTAINING AND PERFORMING OPERATIONS ON PERSISTENT KEY-VALUE STORES

(71) Applicant: Regatta Data Ltd., Bet Hanania (IL)

(72) Inventors: Erez Webman, Petach Tikva (IL); Lior Govrin, Tel Aviv (IL); Alon Shimon Gweta, Dishon (IL)

(73) Assignee: Regatta Data Ltd., Bet Hanania (IL)

( * ) Notice: Subject to any disclaimer, the term of this patent is extended or adjusted under 35 U.S.C. 154(b) by 0 days.

(21) Appl. No.: 19/039,195

(22) Filed: Jan. 28, 2025

(65) Prior Publication Data

US 2026/0220161 A1 Jul. 30, 2026

(51) Int. Cl.
*G06F 17/30* (2006.01)
*G06F 16/22* (2019.01)
*G06F 16/28* (2019.01)

(52) U.S. Cl.
CPC ........ *G06F 16/284* (2019.01); *G06F 16/2255* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2010/0198849 | A1* | 8/2010 | Thomas | G06F 16/10 707/E17.014 |
| 2012/0102298 | A1* | 4/2012 | Sengupta | G06F 12/0864 711/216 |
| 2012/0209855 | A1* | 8/2012 | Shinjo | G06F 16/322 707/E17.012 |
| 2021/0406235 | A1* | 12/2021 | Killamsetti | G06F 16/2272 |
| 2024/0330263 | A1* | 10/2024 | Jarvis | G06F 3/0604 |
| 2026/0010475 | A1* | 1/2026 | Vavilapalli | G06F 3/067 |

* cited by examiner

*Primary Examiner* — Hung D Le
(74) *Attorney, Agent, or Firm* — M&B IP Analysts, LLC

(57) ABSTRACT

A system and method for maintaining a persistent key-value store is presented. The method includes mirroring at least one persistent page to at least one corresponding non-persistent page, wherein the at least one persistent page and the at least one corresponding non-persistent page each contain at least one slot each containing a key-value pair entry and an associated update number (UN); maintaining an association of a key with a pointer, wherein the pointer points to the slot containing the key-value pair entry, for the key, with the highest UN; and maintaining an association of a key with a reference counter (REFC), wherein the REFC counts the number of key-value pair entries, for the key, whose UN is below a maximum; maintaining, for each slot, a marking at least of used or available; and performing key-value store operations on the non-persistent page before they are persisted to the persistent page.

16 Claims, 8 Drawing Sheets

SYSTEM AND METHOD FOR MAINTAINING AND PERFORMING OPERATIONS ON PERSISTENT KEY-VALUE STORES

TECHNICAL FIELD

The present disclosure relates generally to the maintenance and performance of persistent key-value stores.

BACKGROUND

Key-value stores are a non-relational data storage paradigm sometimes referred to as NoSQL databases where data is stored as a collection of key-value pairs. Each key is unique and is used to retrieve the associated value. This model is used in scenarios where the primary operation is to look up data based on a key.

For a key-value store that stores customer purchases, the key may be the customer ID, and the value may be the catalog number of the last item ordered. When a customer places their first order, a new key-value pair is created in the store, associating the customer ID with the item ID. For subsequent orders by the same customer, the value (item ID) is updated to reflect the most recent order, replacing the previous item ID. This way, the key-value store always provides the latest item ID when queried with the customer ID.

Data in persistent key-value stores are saved to non-volatile storage, such as a hard drive or solid-state drive (SSD). This ensures that the data remains intact even if the system is restarted. Persistence is crucial for maintaining data integrity and availability over time.

However, persistent key-value stores face certain challenges. One issue is that they must occasionally pause or slow down to compact their logs. Log compaction is a process that helps manage storage space and improve performance by removing outdated or redundant data. During this process, the database may experience reduced performance, which can impact the overall system's responsiveness.

Another problem is that persistent key-value stores often involve a high number of write and read operations. Each update to a key-value pair requires a write operation, and frequent reads are necessary to retrieve the stored values. This can lead to increased wear on storage devices, lower throughput, and higher latency, especially under heavy load conditions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include mirroring at least one persistent page to at least one corresponding non-persistent page, where the at least one persistent page and the at least one corresponding non-persistent page each contain at least one slot each containing a key-value pair entry and an associated update number. The method may also include maintaining an association of a key with a pointer, where the pointer points to the slot containing the key-value pair entry, for the key, with the highest update number. The method may furthermore include maintaining an association of a key with a reference counter, where the reference counter counts the number of key-value pair entries, for the key, whose update number is below a maximum. The method may in addition include maintaining, for each slot, a status marking at least of used or available. The method may moreover include performing one or more key-value store operations on the non-persistent page before they are persisted to the persistent page. Other embodiments of this aspect include corresponding computer systems, apparatus, and computer programs recorded on one or more computer storage devices, each configured to perform the actions of the methods.

Implementations may include one or more of the following features. The at least one corresponding non-persistent page included in the method is stored in a volatile memory unit and the at least one persistent page included in the method is stored in a non-volatile memory unit. Performing the key-value operations of the method may further include performing the key-value operations based on the pointers, the update numbers, the reference counts, and the status markings. Performing the key-value store operations of the method may also include: detecting that a first slot containing a first key-value pair entry for a first key is marked as available and has an update number less than a maximum; decrementing the reference counter associated with the first key; marking as available a second slot pointed to by the pointer associated with the first key, when the reference counter decrements to zero; and overwriting the first slot with a second key-value pair entry. Performing the key-value store operations of the method may further include: detecting that a first slot containing a first key-value pair entry for a first key is marked as available and has an update number set to maximum; and overwriting the first slot with a second key-value pair entry. Performing the key-value store operations of the method may also include: assigning at least one non-persistent page as an active page; overwriting a slot in the active page that is marked as available, where a new key-value pair entry for a key is inserted into the available slot; performing a key-value operation; and persisting the active page. Persisting the active page may further include: when the active page is full or required to be synchronously persisted, persisting the active page synchronously; when the active page is not full or required to be synchronously persisted, persisting the active page asynchronously; and when the active page is full, selecting a new active page. Performing a key-value operation of the method when the key does not have an association with a pointer may include: associating the key with a pointer, where the pointer points to the slot of the new key-value pair entry; associating the key with a reference counter, where the reference counter has a value of one; and assigning an initial update number to the key-value pair entry. Performing a key-value operation of the method when the key does have an association with a pointer may include: marking the slot of the key-value pair entry pointed to by the associated pointer as available; setting the update number of the new key-value pair to a value larger than the update number of the pointed to key-value pair but less than a maximum; incrementing the associated reference counter for the key; updating the associated pointer to point to the slot of the new key-value pair entry; and marking the slot of the new key-value pair entry as used. Performing a key-value operation of the method may further include: marking the slot of the key-value pair entry pointed to by the pointer associated with the key as available; setting the update number of the new key-value pair entry to a maximum; updating the pointer associated with the key to point to the slot of the new key-value pair entry; and marking the slot of the new key-value pair as used. The method may also include: detecting that a key-value pair entry for a key on a non-persistent page has an associated reference count of zero and has an update number set to a maximum; and marking the slot as available. The method may include a feature where at most one non-persistent page is persisted to the corresponding persistent page for each key-value store operation. The method may further include: removing the association of a key with a pointer and the association of a key with a reference counter when the reference counter becomes zero. The method may also include: maintaining the association of a key with a pointer and the association of a key with a reference counter in a hash table; and computing a hash function of the hash table over a key. The method may further include: providing at least one persistent page; mirroring the at least one persistent page to a corresponding at least one non-persistent page; examining the key-value pair entries in the slots of the at least one non-persistent page; associating a key with a pointer, where the pointer points to the slot containing the key-value pair entry, for the key, with the highest update number; associating a key with a reference counter, where the reference counter counts the number of key-value pair entries, for the key, whose update number is below a maximum; and determining the marking of used or available for the slots of the at least one non-persistent page. The method may also include a feature where the one or more persistent pages are selectively mirrored to one or more fewer non-persistent pages according to some caching algorithm. Implementations of the described techniques may include hardware, a method or process, or a computer tangible medium.

In one general aspect, a non-transitory computer readable medium has stored thereon instructions for causing a processing circuitry to execute a process comprising: mirroring at least one persistent page to at least one corresponding non-persistent page, where the at least one persistent page and the at least one corresponding non-persistent page each contain at least one slot each containing a key-value pair entry and an associated update number; maintaining an association of a key with a pointer, where the pointer points to the slot containing the key-value pair entry, for the key, with the highest update number; maintaining an association of a key with a reference counter, where the reference counter counts the number of key-value pair entries, for the key, whose update number is below a maximum; maintaining, for each slot, a status marking at least of used or available; and performing one or more key-value store operations on the non-persistent page before they are persisted to the persistent page. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: mirror at least one persistent page to at least one corresponding non-persistent page, where the at least one persistent page and the at least one corresponding non-persistent page each contain at least one slot each containing a key-value pair entry and an associated update number; maintain an association of a key with a pointer, where the pointer points to the slot containing the key-value pair entry, for the key, with the highest update number; maintain an association of a key with a reference counter, where the reference counter counts the number of key-value pair entries, for the key, whose update number is below a maximum; maintain, for each slot, a status marking at least of used or available; perform one or more key-value store operations on the non-persistent page before they are persisted to the persistent page. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include a method and system for maintaining and performing operations on persistent key-value stores. The disclosed various embodiments employ a combination of techniques such as reference counting, pointers, update numbers, status markings, and active pages. The disclosed embodiments allow multiple queries or updates to the contents of key-value pair entries using at most one write operation on average and zero read operations. The reduction in read and write operations without sacrificing the ability to query or update the key-value stores allows for increased efficiency of persistent data structures by reducing computation power and time as well as computer resource usage.

Additionally, the disclosed embodiments, particularly the use of tombstones to shadow older data entries, allow this key-value store to perform compaction of logs without pausing or reducing processing speed for the persistent key-value store operations. Moreover, performing multiple updates on an active non-persistent page in a volatile memory unit before the updates are persisted to a corresponding persistent page persists the multiple updates with only one write. The persistence of an active non-persistent page to a corresponding persistent page allows the keys and their associated values to survive crashes and restarts on computer systems that employ the system and methods disclosed herein.

Figure 1:
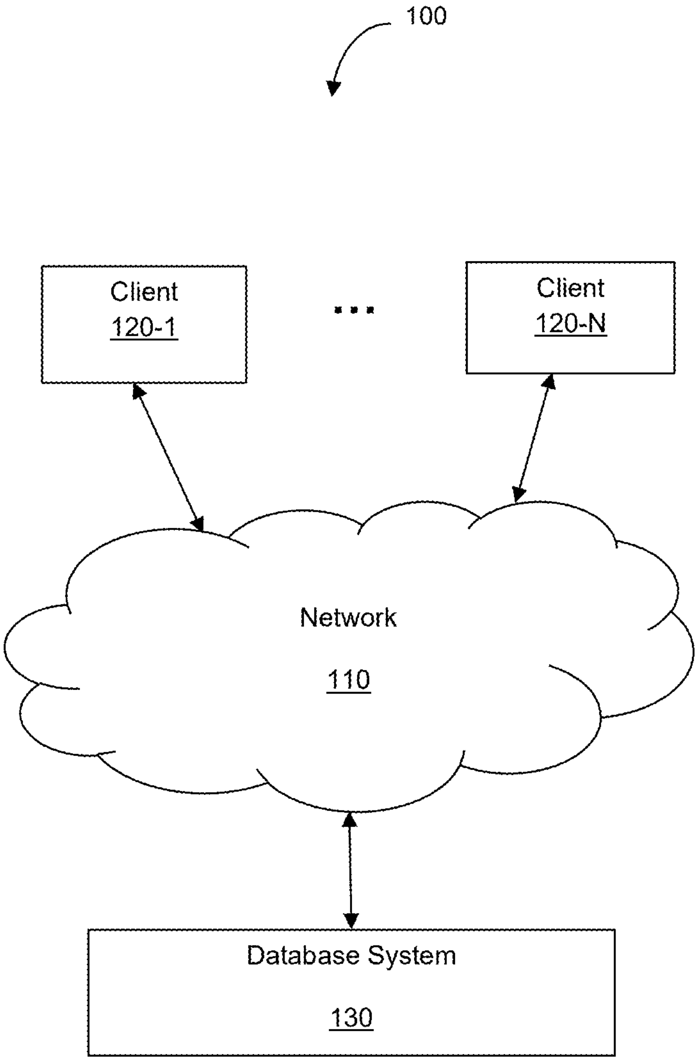
FIG. 1 is an example network diagram 100 utilized to describe the various disclosed embodiments.

FIG. 1 shows an example network diagram 100 utilized to describe the various disclosed embodiments. In the example network diagram 100, a plurality of clients 120-1 through 120-N (hereinafter referred to individually as a client 120 and collectively as clients 120, merely for simplicity purposes) and a database system 130, communicate via a network 110. Database system 130 may include a distributed or non-distributed database. The network 110 may be, but is not limited to, a wireless, cellular or wired network, a local area network (LAN), a wide area network (WAN), a metro area network (MAN), the Internet, the world wide web (WWW), similar networks, and any combination thereof.

Each client 120 is configured to access the database system 130. A client 120 may include any computing device executing applications, services, processes, and so on. A client 120 can run in a virtual instance (e.g., a virtual machine, a software container, and the like).

In some configurations, clients 120 may be software entities that interact with the database system 130. Clients 120 are typically located in compute nodes that are separate from the database system 130 and communicate with the database system 130 via an interconnect or over a network. In some configurations, an instance of a client 120 can reside in a node that is part of the database system 130.

The database system 130 is configured to perform operations, such as read operations and write operations, on the various data structures, including non-persistent pages, persistent pages, and hash tables, discussed in more detail hereinbelow. Database system 130 executes these operations according to various techniques discussed in more detail hereinbelow. In an embodiment, the database system 130 includes key-value stores, and the database system 130 is configured to perform the disclosed techniques in the various data structures of the key-value stores. A key-value pair consists of a key, which is a unique identifier used to access a corresponding value. A value is the data or information that the key is associated with and points to.

Key-value stores may be stored on one node, in a non-distributed database, or more than one node, in a distributed database. Each node may be configured as a relational or non-relational database. Each node may be realized as a physical device or a virtual instance executed on a physical device. A virtual device may include a virtual machine, a software container, a service, and the like. The physical device, an example of which is disclosed below, includes at least a processing circuitry and a memory. A physical device may also include a storage, a shared storage accessed by other nodes, or a combination thereof. An example block diagram of the hardware for implementing a node of a database system 130 is provided in FIG. 8. The storage stores the data maintained by the database system 130. The nodes may be deployed in one or more data centers, cloud computing platforms, and the like. The communication and synchronization among the nodes are performed through an interconnect network.

In an embodiment, each node includes an agent (not shown) configured to manage access to data stored on the respective node. The agent may be realized in hardware, software, firmware, or a combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The agent is configured to manage the key-value pair entries and operations on key-value stores within a node.

The arrangement and configurations illustrated in FIG. 1 are provided solely for exemplary purposes. The present disclosure is not limited to the specific embodiment depicted in this figure. Variations, modifications, and alternative arrangements may be employed without departing from the spirit and scope of the disclosed embodiments.

Figure 2:
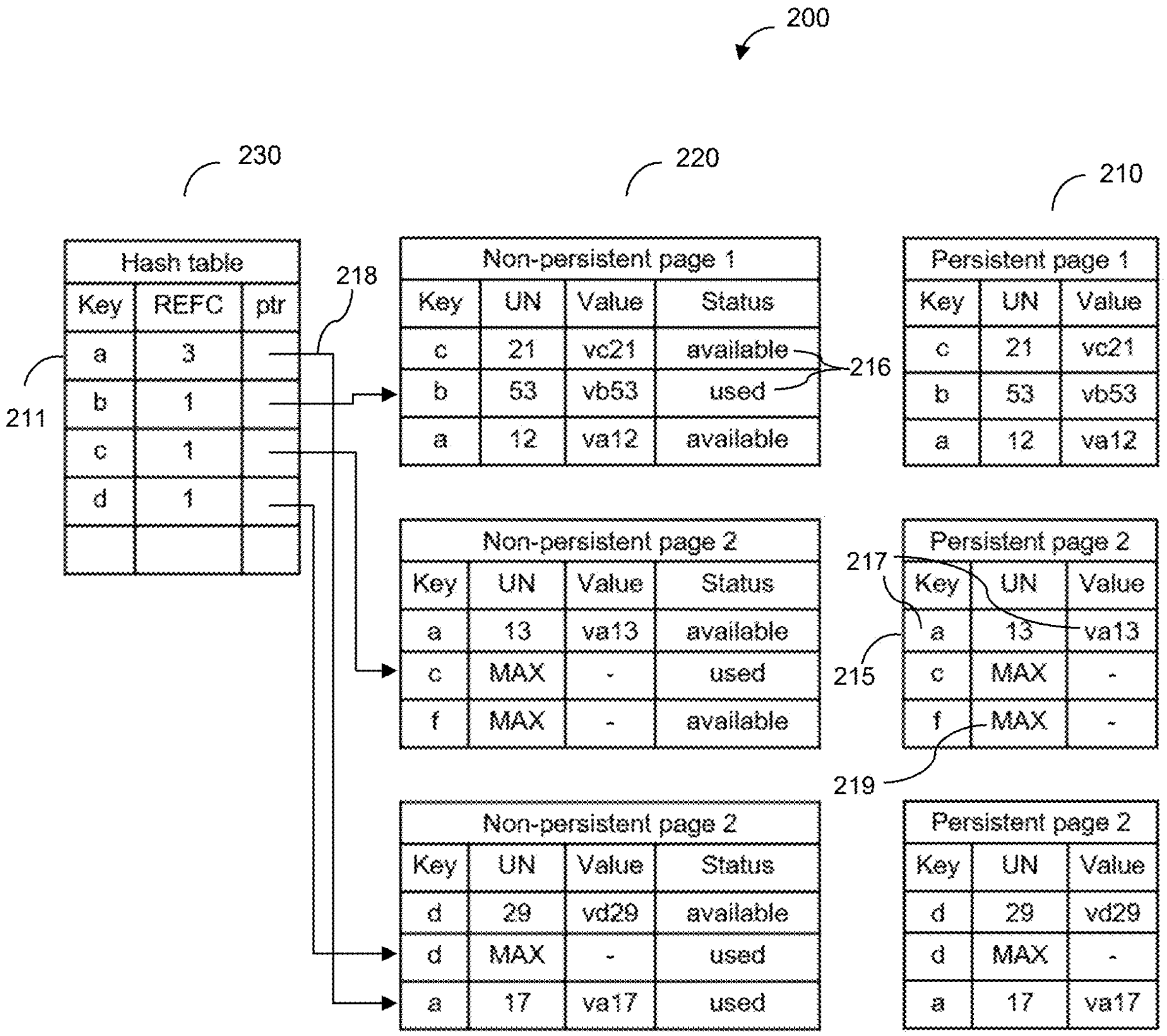
FIG. 2 is a persistent key-value store 200 that includes various data structures and their interactions.

FIG. 2 illustrates a persistent key-value store 200 that includes various data structures and their interactions. In an embodiment, the database system 130 includes nodes that store the persistent key-value store 200 and is configured to execute the various disclosed techniques on the persistent key-value store 200. The structure of the persistent key-value store 200 as well as the techniques executed by the database system 130 allows for higher data throughput, faster computer processing, and less computer resource usage through the use of reference counting, entry shadowing, tombstones, write aggregation, and implicit permanent deletion as mentioned above and disclosed in more detail hereinbelow.

In the persistent key-value store 200, a plurality of persistent pages 210 (hereinafter referred to individually as a persistent page 210 and collectively as persistent pages 210, merely for simplicity purposes) and non-persistent pages 220 (hereinafter referred to individually as a non-persistent page 220 and collectively as non-persistent pages 220, merely for simplicity purposes) contain a table with slots 215 and key-value pair entries 217 in those slots. A slot is defined as the space in the page, and an entry is defined as the contents in the slot. Persistent page 210 contains columns for key, update number (UN), and value. A key is a unique identifier used to access a corresponding value. A value is the data or information that the key is associated with and points to. A key-value pair entry 217 is an entry of a key and the key's associated value in slot 215.

A UN is a monotonically increasing counter that is increased whenever an update is applied to a value associated with a key. In an embodiment, the UN preserves the order of updates and serves as a time sequence of changes to the value associated with a key.

In the example persistent pages 210, the persistent page 1 contains key "a" with a value of "va12" and a UN of 12. Additionally, the persistent page 2 contains the key "a" with a value of "va13." Persistent page 3 contains the key "a" with a value of "va17." The value "va13" is a newer value for the key "a" than "va12" because "va13" has a higher UN of 13. Similarly, the value "va17" is the newest value in the persistent pages 210 for the key "a" because it has a UN of 17, which is higher than any other UN for the key "a" in the persistent pages 210 in the persistent key-value store 200. The key-value pair with the highest UN "shadows" all key-value pair entries with the same key but a lower UN i.e., key-value pairs that were added to the key-value store earlier than the key-value pair with the highest UN. The slots of shadowed entries are marked as available and may be overwritten with new contents. The use of shadowing enables implicit permanent deletion. Implicit permanent deletion occurs as a result of the overwrite i.e., when a new key-value is inserted into an available slot.

A UN may contain an entry 215 with an associated UN of MAX 219 (hereinafter tombstone, MAX, or tombstone MAX, merely for simplicity purposes). MAX is the highest possible UN for a given key. Adding a tombstone for a key is the mechanism for recording that the key has been deleted. The tombstone indicates that all the earlier entries for a key are shadowed by this MAX. This shadowing means that the earlier entries for the key may be overwritten. As explained above, the use of tombstone shadowing allows for implicit permanent deletion.

For example, in the persistent key-value store 200 on persistent page 210 at 219, there is a MAX for key "c" in persistent page 2. This means that the entries for key "c" in persistent page 1 showing a value of "vc21" and UN 21 are shadowed by the MAX.

Shadowing is disclosed in more detail hereinbelow.

In an embodiment, only the persistent pages 210 survive a restart. Other data structures are constructed from them. This is discussed in more detail with respect to FIG. 7.

Persistent pages 210 are mirrored into corresponding non-persistent pages 220. Non-persistent pages 220 reflect the entries 217 for their respective persistent pages 210. In addition to containing these entries 217, non-persistent pages 220 contain "status" markings 216 for the slots 215 for a given key. These status markings 216 indicate the availability of the slots 215 for a key and the key's corresponding value and UN. For example, in non-persistent page 1, the status markings 216 of the slots corresponding to key "c" are "available." The status is available because there is a MAX for the key "c" in non-persistent page 2 that shadows the entries for key "c" in non-persistent page 1. The status of the slots for key "c" in non-persistent page 2 is "used," because the row contains the most recent entry for key "c."

In an embodiment, the status markings 216 may be implemented as a bitmap stored in a volatile memory unit associated with the non-persistent page 220. In such an embodiment, one bit would correspond to one slot. In an alternative embodiment, the status markings 216 may be implemented by using one of the unused bits in the slots in the non-persistent page 220.

In non-persistent page 220, the key "f" has a tombstone. However, the tombstone does not shadow any other entries for the key "f" because there are no other slots containing entries corresponding to the key "f" in the non-persistent pages 220. The status of the slot containing the tombstone of "f" is marked as "available" because the entry may be overwritten. This type of tombstone will hereinafter be referred to as "derelict tombstone." Derelict tombstones are discussed in more detail with respect to FIG. 4, S450.

In an embodiment, all changes to key-value pairs are first made in slots of at least one non-persistent page that is denoted as an active page. In an embodiment, an active page may be one non-persistent page or multiple non-persistent pages. An active page serves as a "staging" area for all updates to the database system 130. For example, when a user inserts, updates, or deletes entries, the operation involves evacuating the entries that the user wants to overwrite and overwriting the available slots in the active page with the entries requested by the user. In an embodiment, if the status markings 216 of all the slots in an active page are "used", then the active page is considered "full," and a new active page may be chosen.

The updates that are made to the active page are persisted to its corresponding persistent page 210 when the active page is written to its corresponding persistent page 210.

In one embodiment, the user may request that an operation be persisted as soon as possible e.g., synchronous operation. In another embodiment, the user may request that the operation be persisted at the convenience of the key-value store e.g., asynchronous operation. In this way, the key-value store may persist multiple user operations in one write of an active page to its corresponding persistent page.

In an embodiment, a hash table 230 is kept in a volatile memory unit. The hash table 230 may contain hash table entries 211 for key, reference counter (REFC), and pointers 218. In an embodiment, and without loss of generality, each key in the hash table 230 may have an association with both a respective REFC and a respective pointer. In another embodiment, and without loss of generality, each key in the hash table 230 may have one association with a respective REFC and another association with a respective pointer. Through the pointers 218, the hash table 230 provides access to the storage location of the most recent entry 217 for each key e.g., the entry with the highest UN. The key column in the hash table 230 corresponds to the key entries in the persistent pages 220.

The REFC is used to count the total number of key-value pair entries 217 that the key has in all the persistent pages 220. In an embodiment, the REFC does not count entries if their UN is MAX. The REFC for a given key is incremented when a new entry is added to an available slot for that given key. The REFC for a given key is decremented when an available slot containing an entry for that given key is evacuated prior to being overwritten. Incrementing and decrementing the REFC according to various embodiments is disclosed hereinbelow. The pointer 218 for a given key in the hash table entry 211 points to the most recent key-value pair entry 217 for that given key. In an embodiment, at the startup of the persistent key-value store 200, the most recent entry pointed to by the pointer indicates that the slot is used. The startup operation is discussed in more detail with respect to FIG. 7.

Figure 3:
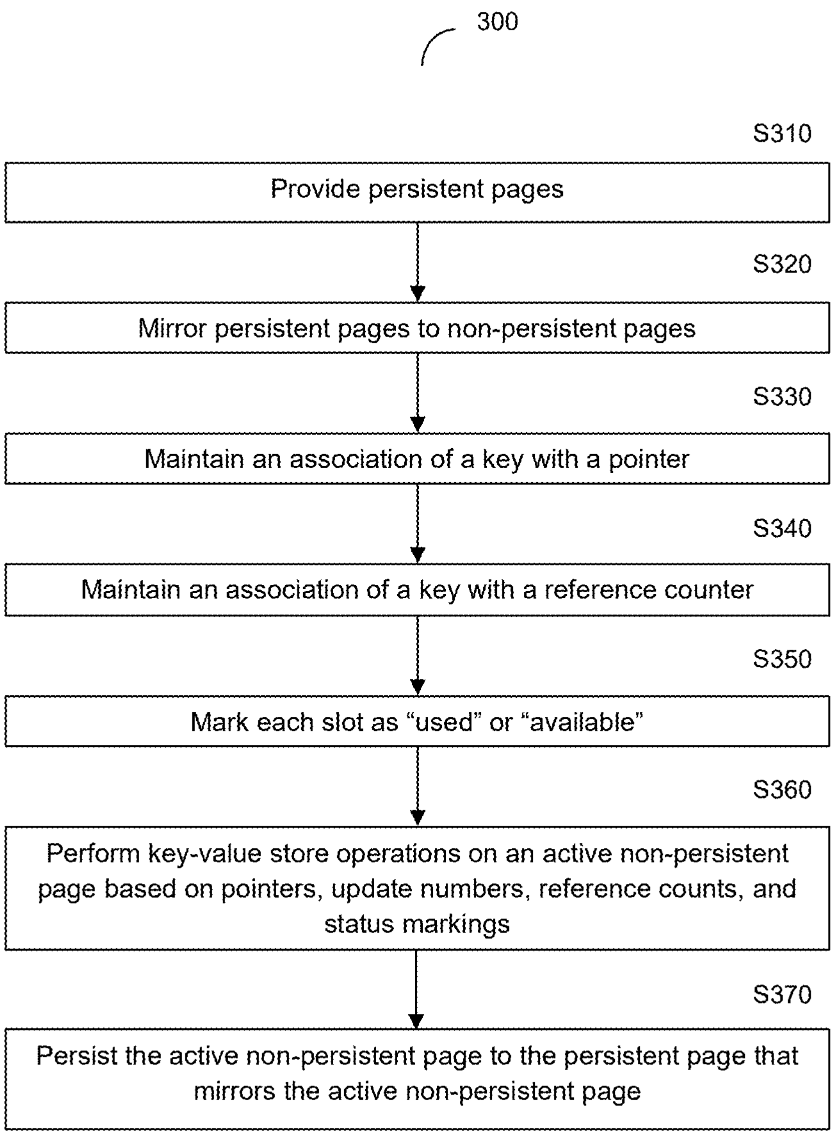
FIG. 3 is an example flowchart 300 of a process for maintaining a persistent key-value store.

FIG. 3 illustrates an example flowchart 300 of a process for maintaining a persistent key-value store. In an embodiment, the maintenance of persistent key-value stores occurs in a database (e.g., database system 130, FIG. 1).

It should be noted that the order of the steps of example flowchart 300 in FIG. 3 may be performed in a different order, with fewer or additional steps or blocks, and should not be limited to the amount and order of the steps and blocks disclosed with respect to the example flowchart 300 and FIG. 3.

At S310, persistent pages are provided. Each persistent page contains a table with slots 215 and key-value pair entries 217 in those slots. Each persistent page contains columns for key, UN, and value. Persistent pages are kept in a non-volatile memory unit. Persistent pages are described in detail with respect to FIG. 2, 210. In an alternate embodiment, the tabular form of key-value pair entries 217 and their UNs shown in FIG. 2 may be actually stored in a different format.

At S320, persistent pages are mirrored to non-persistent pages. Non-persistent pages reflect the entries for their respective persistent pages, as explained in detail above with respect to FIG. 2, 220. Non-persistent pages are stored in a volatile memory unit.

At S330, an association of keys with a pointer is maintained. In an embodiment, the association of each key with a pointer is maintained for each key in a hash table. In a further embodiment, the hash function of the hash table is computed over a key. Maintaining an association of each key with a respective pointer allows each pointer to indicate, by pointing to the relevant key-value pair entry, which key-value pair entry is the most recent entry in the persistent page or non-persistent page i.e., the key-value pair entry with the highest update number in any page.

At S340, an association of a key with a REFC is maintained. In an embodiment, the association of each key with a REFC is maintained for each key in a hash table. The REFC counts all key-value pair entries in which the update number for the entry is below a maximum. In some embodiments, the association of a key with a pointer and the association of a key with a REFC is removed when the number of references counted by the REFC becomes zero. When the REFC count becomes zero, there are no key-value pair entries to point to and, thus, there is no need to maintain the association with a pointer and the REFC for the key.

At S350, each slot is marked as "used" or "available." In an embodiment, such status markings are maintained and appropriately updated (according to various disclosed embodiments) for each slot in each of the persistent pages. The markings indicate the availability status of the slots.

At S360, key-value store operations are performed on an active non-persistent page based on pointers, UN, REFC, and status markings. Key-value operations, according to various disclosed embodiments, are performed as disclosed in detail hereinbelow. The key-value operations disclosed herein are based on, and involve the modification of, where the pointers point to, the value of each UN (including whether the UN is below or set to a maximum), the count of (including incrementing, decrementing, and deleting) each REFC, and the "used" or "available" marking of each slot.

At S370, for each key-value store operation, at most one active non-persistent page is persisted to a corresponding persistent page. In an embodiment, the corresponding persistent page is the persistent page that is mirrored to the at most one active non-persistent page. In a further embodiment, it is determined whether the active page is full. An active page is full when there are no remaining slots that are marked as available. When the active page is full, the active page is persisted to its corresponding persistent page, and a new active page is selected.

Figure 4:
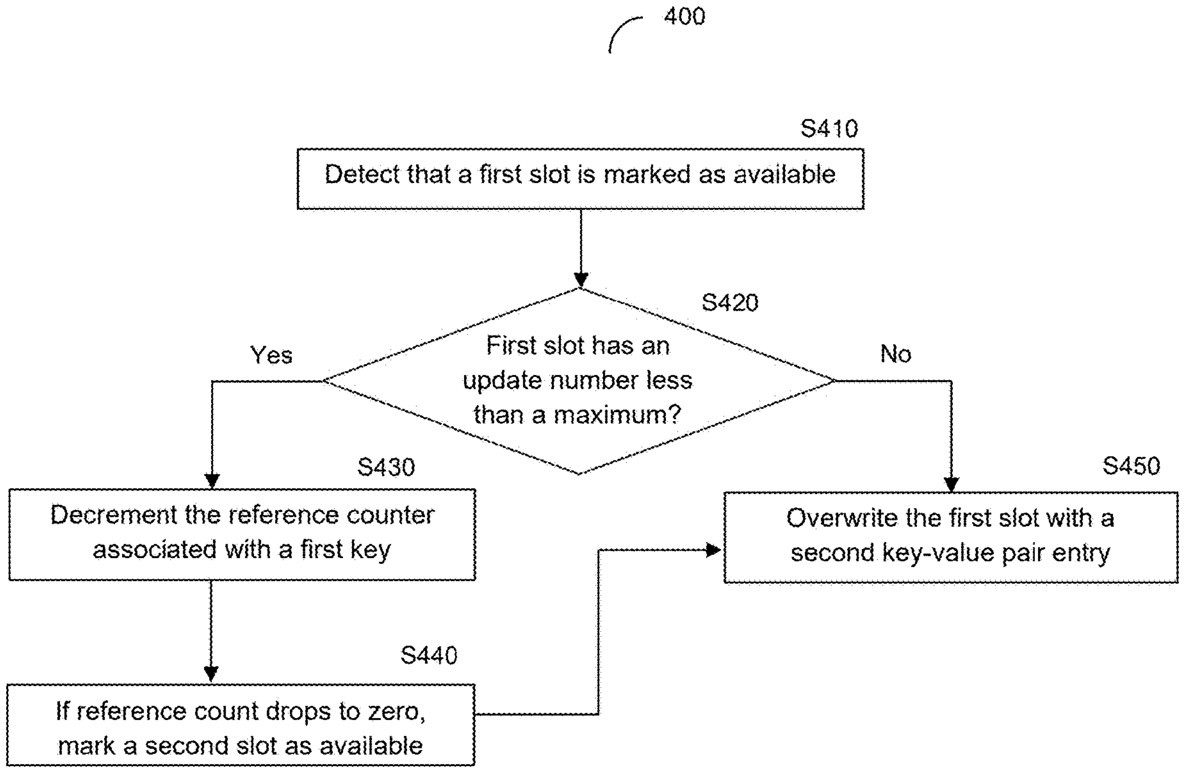
FIG. 4 is an example flowchart 400 of an evacuation operation on a persistent key-value store.

FIG. 4 is an example flowchart 400 of an evacuation operation on a persistent key-value store. In an embodiment, this operation is performed in a database (e.g., database system 130, FIG. 1) using a combination of techniques using update numbers to shadow old key-value pair entries.

It should be noted that the order of the steps of example flowchart 400 in FIG. 4 may be performed in a different order, with fewer or additional steps or blocks, and should not be limited to the amount and order of the steps and blocks disclosed with respect to the example flowchart 400 and FIG. 4.

At S410, a first slot, including a first key-value pair entry for a first key, marked as available is detected. In an embodiment, the first slot that is marked as available is not pointed to by the pointer associated with the first key. The first slot for a first key-value pair entry that is marked as available may, in one embodiment, have a UN set to a maximum or may, in another embodiment, have a UN below a maximum.

At S420, it is detected whether the first slot is marked as available and has an associated UN less than a maximum. If NO, execution proceeds with S450. If YES, execution proceeds with S430.

At S430, when it is detected that the first slot is marked as available and has an associated UN less than a maximum, the REFC, in a hash table, associated with the first key is decremented. For example, the first key is "a" and the key-value pair entry is "a" in and "va12," in the first slot. The UN associated with this key-value pair entry is set to "12," which is not set to a maximum, e.g., is not marked as MAX. The REFC for the first key "a," for example, is 3, which means that there are three (3) total key-value pair entries for the first key "a" in the non-persistent pages. In this example, REFC for "a" is decremented from three (3) to two (2).

At S440, if the REFC for the first key decrements to zero, a second slot pointed to by a pointer associated with the first key is marked as available. In an embodiment, the second slot pointed to by the pointer associated with the first key was originally marked as used before it was marked as available. After S440 is completed, execution proceeds with S450, where the first slot is overwritten with a second key-value pair entry.

At S450, upon detecting (at S420) that the first slot is marked as available and has an associated UN set to a maximum, the first slot is overwritten with a second key-value pair entry. In an embodiment, the first key-value pair entry in the first slot is considered a derelict tombstone, and the first slot is automatically overwritten with the second key-value pair entry.

Figure 5:
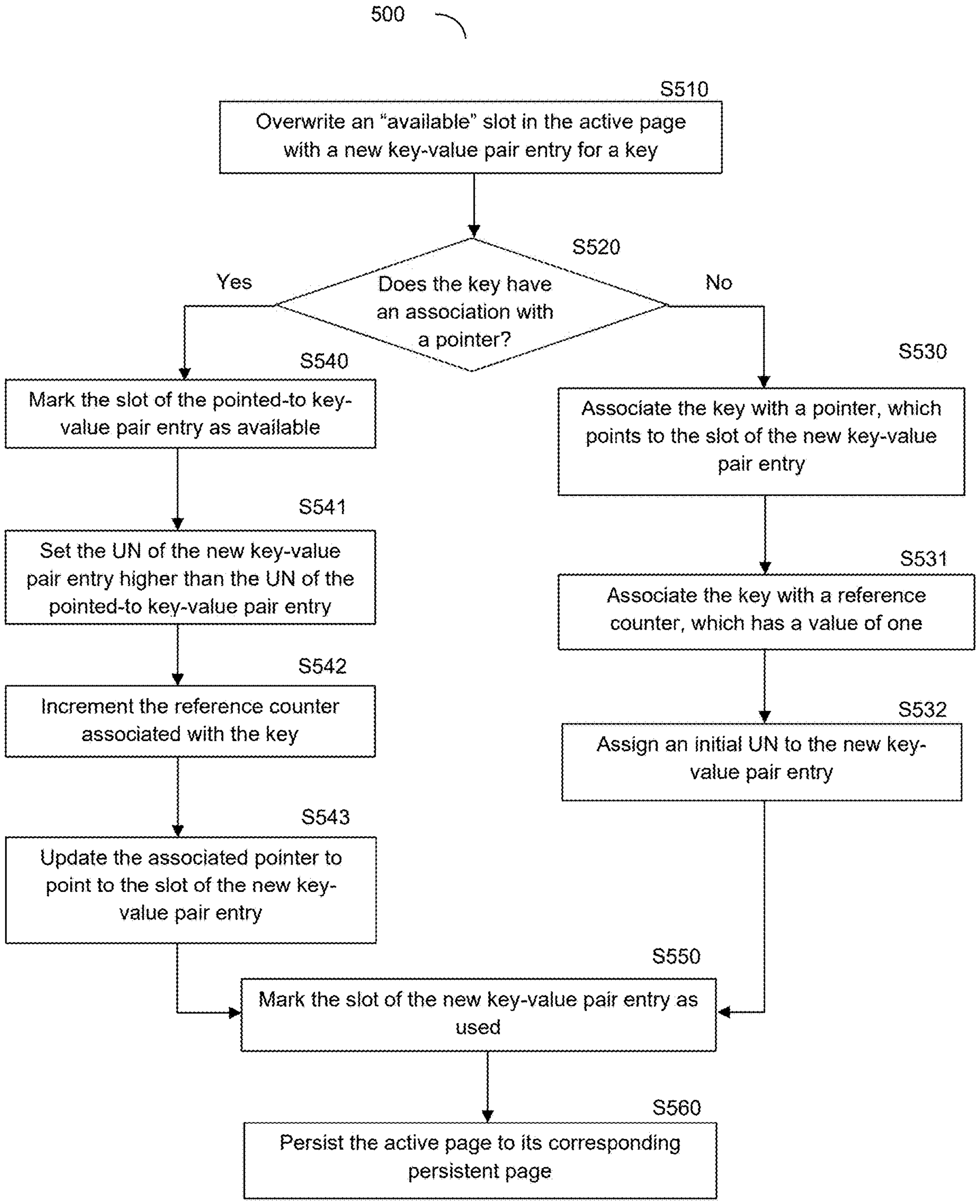
FIG. 5 is an example flowchart 500 of an update operation and an insert operation on a persistent key-value store according to various embodiments.

FIG. 5 is an example flowchart 500 of an update operation and an insert operation on a persistent key-value store according to various embodiments. In an embodiment, the update operation is performed when the key is already known, and the insert operation is performed when the key is unknown. In an embodiment, the operations occur in a database (e.g., a database associated with the database system 130, FIG. 1).

In an embodiment, the operations disclosed with respect to FIG. 5 are performed in accordance with various embodiments disclosed with respect to the evacuation operation (example flowchart 400, FIG. 4) such that the evacuation operation is implicitly performed in conjunction with the operations disclosed with respect to FIG. 5.

It should be noted that the order of the steps of example flowchart 500 in FIG. 5 may be performed in a different order, with fewer or additional steps or blocks, and should not be limited to the amount and order of the steps and blocks disclosed with respect to the example flowchart 500 and FIG. 5.

At S510, a first slot, containing an original key-value pair entry, marked as available in the active page is overwritten with a new key-value pair entry for a key. In an embodiment, at least one of the non-persistent pages is assigned as an active page.

At S520, it is determined whether the key has an association with a pointer. If NO, execution proceeds with S530, S531, and S532, subsequently. In an embodiment, such steps are part of the insert operation. If YES, execution proceeds with S540. S541, S542, and S543 subsequently. In an embodiment, such steps are part of the update operation.

At S530, when it is determined that the key does not have an association with a pointer, the key is associated with a pointer, which points to the first slot containing the new key-value pair entry.

At S531, the key is associated with a REFC, which has a value of one (1). In an embodiment, the REFC value of one indicates that there is one key-value pair entry for the key, namely, the new key-value pair entry that was inserted at S510.

At S532, an initial UN is assigned to the new key-value pair entry. The initial value of the UN may be one (1) or it may be any other number that is less than a maximum that increases monotonically such as a counter of operations, ticks, the value of a clock, or so on. After S532 completes, execution proceeds with S550.

At S540, when it is determined that the key is associated with a pointer, a second slot, containing a pointed-to key-value pair entry, is marked as available. In an embodiment, the second slot is pointed to by the pointer associated with the key and was originally marked as used before it was marked as available.

At S541, the UN associated with the new key-value pair entry is set to a number higher than the UN of the pointed-to key-value pair entry, but the higher UN is less than a maximum. Setting the UNs as such indicates that the new key-value pair entry is more recently entered than the pointed-to key-value pair entry.

At S542, the REFC associated with the key is incremented. In an embodiment, this incremented value is more than one. As a non-limiting example, the key of a new key-value pair is "a", and the REFC for the key "a," for example, is two (2), which means that there were two (2) total key-value pair entries for the key "a." In this example, REFC for "a" is incremented from two (2) to three (3).

At S543, the pointer associated with the pointed-to key-value pair entry is updated to point to the first slot containing the new key-value pair entry. Once S543 is executed, the series of steps (S540, S541, S542, and S543) associated with the update operation is completed. Then, execution proceeds with S550.

At S550, the first slot of the new key-value pair entry is marked as used. In an embodiment, the first slot for the new key-value pair entry was originally marked as available before it was marked as used.

At S560, the active page is persisted to its corresponding persistent page. In an embodiment, the corresponding persistent page is the persistent page that is mirrored to the at most one active non-persistent page. In an embodiment, persisting the active page to its corresponding persistent page is performed by the database system 130. In a further embodiment, it is determined whether the active page is full. An active page is full when there are no remaining slots that are marked as available. When the active page is full, the active page is persisted to its corresponding persistent page, and a new active page is selected.

Figure 6:
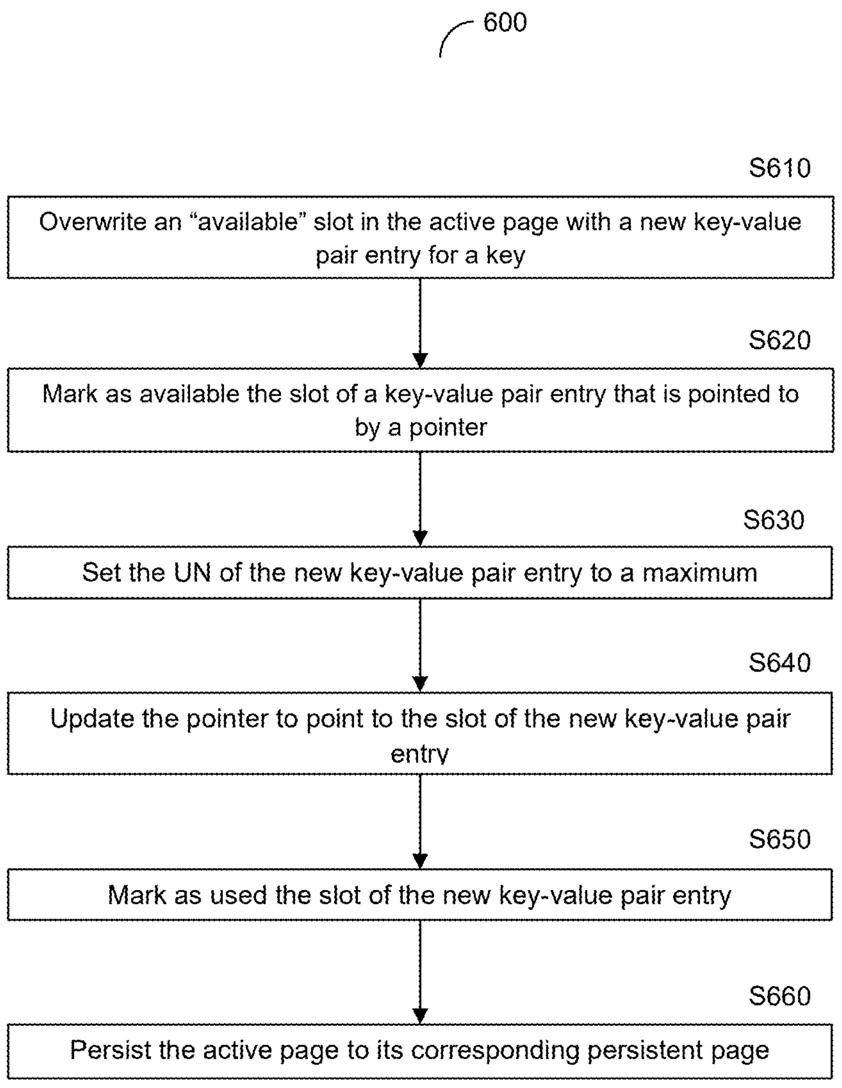
FIG. 6 is an example flowchart 600 of a delete operation on a persistent key-value store.

FIG. 6 is an example flowchart 600 of a delete operation on a persistent key-value store. In an embodiment, this operation occurs in a database (e.g., database system 130, FIG. 1). In an embodiment, the delete operation is considered a special update operation because the deletion occurs through the use of entry shadowing with tombstones, as is discussed in more detail herein.

In an embodiment, the operations disclosed with respect to FIG. 6 are performed in accordance with various embodiments disclosed with respect to the evacuation operation (example flowchart 400, FIG. 4) such that the evacuation operation is implicitly performed in conjunction with the operations disclosed with respect to FIG. 6.

It should be noted that the order of the steps of example flowchart 600 in FIG. 6 may be performed in a different order, with fewer or additional steps or blocks, and should not be limited to the amount and order of the steps and blocks disclosed with respect to the example flowchart 600 and FIG. 6.

At S610, a first slot, containing an original key-value pair entry, marked as available in the active page is overwritten with a new key-value pair entry for a key. The new key-value pair that is overwritten has an empty value and has a UN of MAX, which serves to shadow previous entries. In an embodiment, at least one of the non-persistent pages is assigned as an active page.

At S620, a second slot, containing a pointed-to key-value pair entry, is marked as available. In an embodiment, the second slot is pointed to by the pointer associated with the key and was originally marked as used before it was marked as available.

At S630, the UN associated with the new key-value pair entry is set to a maximum. Setting the UN associated with the new key-value pair entry to a maximum makes the entry a tombstone. Modifying the new key-value pair entry to a tombstone allows the new key-value pair entry to "shadow" the pointed-to key-value pair entry in the second slot. Because the pointed-to key-value pair entry is "shadowed" by the tombstone and is marked as available (as explained in S620 above), the second slot may be overwritten e.g., implicitly permanently deleted, by another key-value pair entry.

At S640, the pointer associated with the pointed-to key-value pair entry is updated to point to the second slot containing the new key-value pair entry.

At S650, the first slot of the new key-value pair entry is marked as used. In an embodiment, the first slot for the new key-value pair entry was originally marked as available before it was marked as used.

At S660, the active page is persisted to its corresponding persistent page. In an embodiment, the corresponding persistent page is the persistent page that is mirrored to the at most one active non-persistent page. In an embodiment, persisting the active page to its corresponding persistent page is performed by the database system 130. In a further embodiment, it is determined whether the active page is full. An active page is full when there are no remaining slots that are marked as available. When the active page is full, the active page is persisted to its corresponding persistent page, and a new active page is selected.

Figure 7:
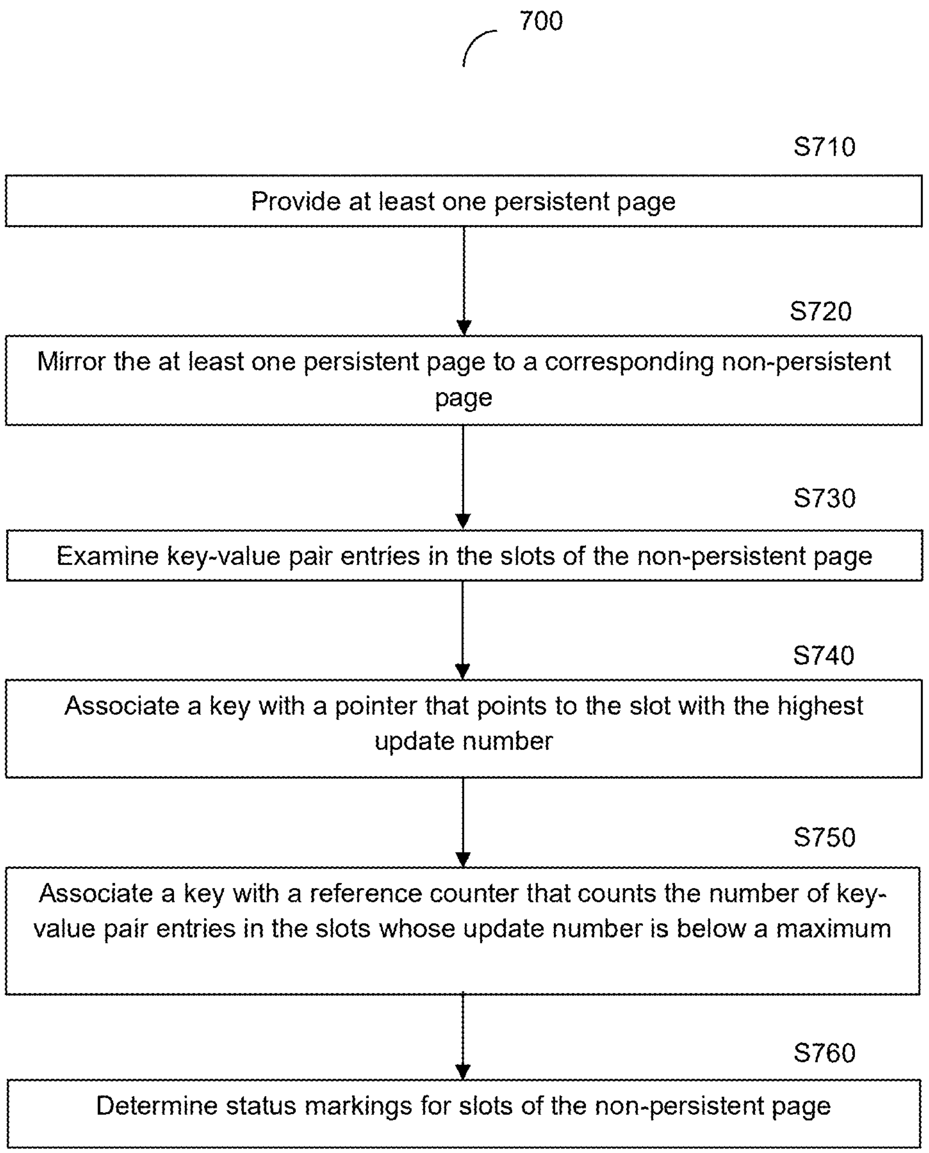
FIG. 7 is an example flowchart 700 of a startup operation of a persistent key-value store.

FIG. 7 is an example flowchart 700 of a startup operation of a persistent key-value store. In an embodiment, the startup operation occurs in a node of the database system 130, FIG. 1. when the node powers up or restarts. In an embodiment, the startup operation in the node is executed by the database system 130.

At S710, at least one persistent page is provided. In an embodiment, the database system 130 is configured to provide the at least one persistent page. In an embodiment, the provided at least one persistent page includes all of the persistent pages in the persistent key-value store.

At S720, a provided persistent page is mirrored to a corresponding non-persistent page. It should be noted that, in some embodiments, not all persistent pages are mirrored to corresponding non-persistent pages at all times. According to such embodiments, at least one persistent page is selectively mirrored to corresponding non-persistent pages through the use of various caching operations.

At S730, the key-value pair entries in the slots of the non-persistent page are examined. In some embodiments, when it is detected that a key-value pair entry for a key on a non-persistent page has an associated reference count of zero and an UN set to a maximum, the slot that contains the key-value pair entry is marked available.

At S740, a key is associated with a pointer. In an embodiment, associating the key with a pointer is performed by the database system 130. The association is performed such that the pointer points to the slot containing the key-value pair entry, for the key that the pointer is associated with, with the highest update number.

At S750, a key is associated with a REFC. In an embodiment, associating the key with a REFC is performed by the database system 130. The association is performed such that the REFC counts the number of key-value pair entries, for the key that the REFC is associated with, whose update number is below a maximum.

At S760, status markings for slots are determined. In an embodiment, the determination of the status markings for slots is executed after all of the persistent pages have been provided at S710.

In an embodiment, the determined status markings are either available or used. According to this embodiment, the status markings are determined for the slots of the non-persistent page. A slot is marked as used if it is pointed to by the pointer associated with its key. Otherwise, a slot is marked as available. Additionally, as discussed above with respect to S730, for a key-value pair entry with an associated reference count of zero and UN of MAX, the slot that contains such a key-value pair entry is marked as available. Such key-value pair entries are removed from the hash table by removing the association of the key with a pointer and the association of the key with a REFC.

In a further embodiment, determining the status markings includes marking the slots with the appropriate status markings. Determining status markings for slots may be performed by the database system 130.

Figure 8:
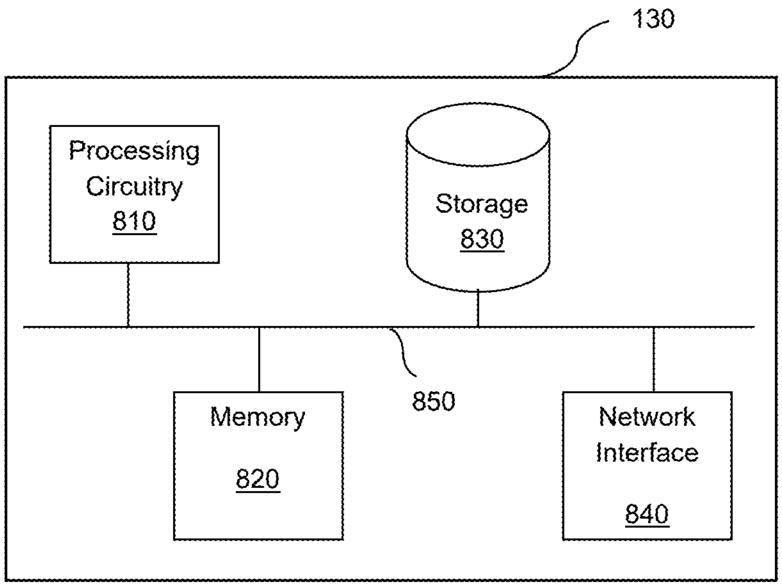
FIG. 8 is an example schematic diagram of the hardware layer for realizing the database system 130 or a node in the database system 130 according to an embodiment.

FIG. 8 is an example schematic diagram of the hardware layer for realizing the database system 130 or a node in the database system 130 according to an embodiment.

The database system 130 includes a processing circuitry 810 coupled to a memory 820, a storage 830, and a network interface 840. In an embodiment, the components of the database system 130 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read-only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the database system 130 to communicate with, for example, clients 120, and the like.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for maintaining a persistent key-value store, comprising:

mirroring at least one persistent page to at least one corresponding non-persistent page, wherein the at least one persistent page and the at least one corresponding non-persistent page each contain at least one slot each containing a key-value pair entry and an associated update number;

maintaining an association of a key with a pointer, wherein the pointer points to the slot containing the key-value pair entry, for the key, with the highest update number;

maintaining an association of a key with a reference counter, wherein the reference counter counts the number of key-value pair entries, for the key, whose update number is below a maximum;

maintaining, for each slot, a status marking at least of used or available;

performing one or more key-value store operations on the non-persistent page before persisting the non-persistent page to the persistent page; and removing the association of a key with a pointer and the association of a key with a reference counter when the reference counter becomes zero.

2. The method of claim 1, wherein the at least one corresponding non-persistent page is stored in a volatile memory unit and the at least one persistent page is stored in a non-volatile memory unit.

3. The method of claim 1, wherein performing the key-value store operations further comprises:

performing the key-value store operations based on the pointers, the update numbers, the reference counts, and the status markings.

4. The method of claim 3, wherein performing the key-value store operations further comprises:

detecting that a first slot containing a first key-value pair entry for a first key is marked as available and has an update number less than a maximum;

decrementing the reference counter associated with the first key;

marking as available a second slot pointed to by the pointer associated with the first key, when the reference counter decrements to zero; and overwriting the first slot with a second key-value pair entry.

5. The method of claim 3, wherein performing the key-value store operations further comprises:

detecting that a first slot containing a first key-value pair entry for a first key is marked as available and has an update number set to maximum; and overwriting the first slot with a second key-value pair entry.

6. The method of claim 3, wherein performing the key-value store operations comprises:

assigning at least one non-persistent page as an active page;

overwriting a slot in the active page that is marked as available, wherein a new key-value pair entry for a key is inserted into the available slot;

performing a key-value operation; and persisting the active page.

7. The method of claim 6, wherein persisting the active page comprises:

when the active page is full or required to be synchronously persisted, persisting the active page synchronously;

when the active page is not full and not required to be synchronously persisted, persisting the active page asynchronously; and when the active page is full, selecting a new active page.

8. The method of claim 6, wherein performing a key-value operation when the key does not have an association with a pointer, further comprising:

associating the key with a pointer, wherein the pointer points to the slot of the new key-value pair entry;

associating the key with a reference counter, wherein the reference counter has a value of one; and assigning an initial update number to the key-value pair entry.

9. The method of claim 6, wherein performing a key-value operation when the key does have an association with a pointer, further comprising:

marking the slot of the key-value pair entry pointed to by the associated pointer as available;

setting the update number of the new key-value pair to a value larger than the update number of the pointed to key-value pair but less than a maximum;

incrementing the associated reference counter for the key;

updating the associated pointer to point to the slot of the new key-value pair entry; and marking the slot of the new key-value pair entry as used.

10. The method of claim 6, wherein performing a key-value operation further comprises:

marking the slot of the key-value pair entry pointed to by the pointer associated with the key as available;

setting the update number of the new key-value pair entry to a maximum;

updating the pointer associated with the key to point to the slot of the new key-value pair entry; and marking the slot of the new key-value pair as used.

11. The method of claim 1, wherein at most one non-persistent page is persisted to the corresponding persistent page for each key-value store operation.

12. The method of claim 1, further comprising:

maintaining the association of a key with a pointer and the association of a key with a reference counter in a hash table; and computing a hash function of the hash table over a key.

13. The method of claim 1, further comprising:

providing at least one persistent page;

mirroring the at least one persistent page to a corresponding at least one non-persistent page;

examining the key-value pair entries in the slots of the at least one non-persistent page;

associating a key with a pointer, wherein the pointer points to the slot containing the key-value pair entry, for the key, with the highest update number;

associating a key with a reference counter, wherein the reference counter counts the number of key-value pair entries, for the key, whose update number is below a maximum; and determining the marking of used or available for the slots of the at least one non-persistent page.

14. The method of claim 13, further comprising:

detecting that a key-value pair entry for a key on a non-persistent page has an associated reference count of zero and has an update number set to a maximum; and marking the slot as available.

15. A non-transitory computer readable medium having stored thereon instructions for causing a processing circuitry to execute a process, the process comprising:

mirroring at least one persistent page to at least one corresponding non-persistent page, wherein the at least one persistent page and the at least one corresponding non-persistent page each contain at least one slot each containing a key-value pair entry and an associated update number;

maintaining an association of a key with a pointer, wherein the pointer points to the slot containing the key-value pair entry, for the key, with the highest update number;

maintaining an association of a key with a reference counter, wherein the reference counter counts the number of key-value pair entries, for the key, whose update number is below a maximum;

maintaining, for each slot, a status marking at least of used or available;

performing one or more key-value store operations on the non-persistent page before they are persisted to the persistent page; and removing the association of a key with a pointer and the association of a key with a reference counter when the reference counter becomes zero.

16. A system for maintaining a persistent key-value store, comprising:

a processing circuitry; and a memory, the memory containing instructions that, when executed by the processing circuitry, configure the system to:

mirror at least one persistent page to at least one corresponding non-persistent page, wherein the at least one persistent page and the at least one corresponding non-persistent page each contain at least one slot each containing a key-value pair entry and an associated update number;

maintain an association of a key with a pointer, wherein the pointer points to the slot containing the key-value pair entry, for the key, with the highest update number;

maintain an association of a key with a reference counter, wherein the reference counter counts the number of key-value pair entries, for the key, whose update number is below a maximum;

maintain, for each slot, a status marking at least of used or available;

perform one or more key-value store operations on the non-persistent page before they are persisted to the persistent page; and remove the association of a key with a pointer and the association of a key with a reference counter when the reference counter becomes zero.

* * * * *